Aug. 27, 1929.                J. GOODMAN                    1,726,393
                              SHADE ROLLER
                          Filed Sept. 25, 1926
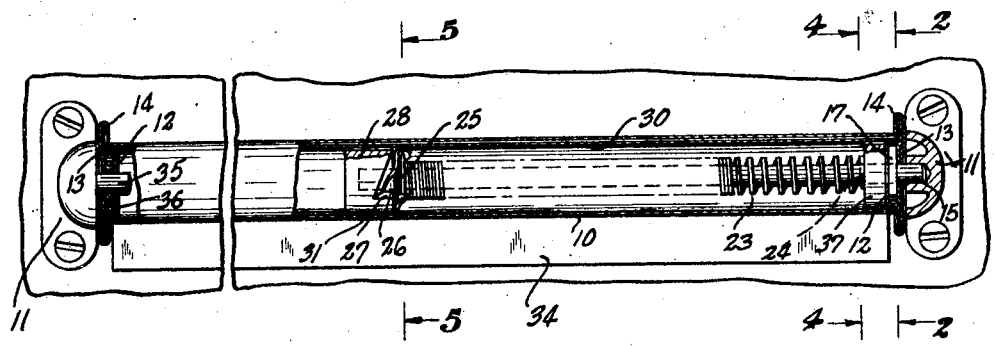
Fig. 1.
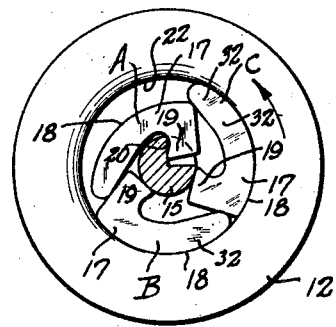
Fig. 2.
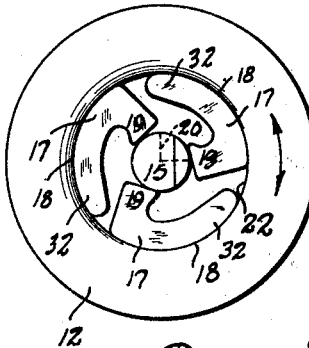
Fig. 3.
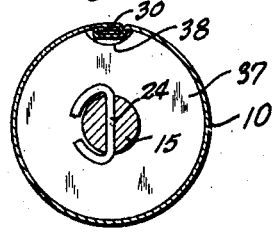
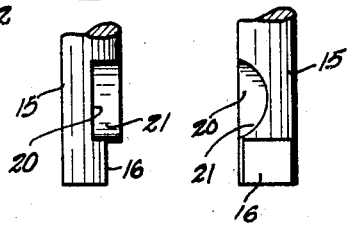 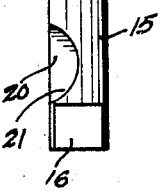
Fig. 6.   Fig. 7.
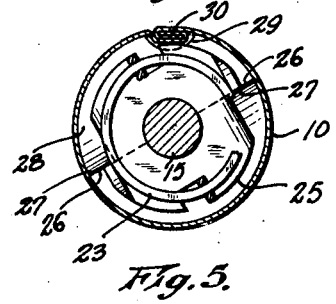
Fig. 5.
Inventor
Joseph Goodman
By Wooster & Davis
Attorneys Patented Aug. 27, 1929.

1,726,393

UNITED STATES PATENT OFFICE.

JOSEPH GOODMAN, OF WHITNEYVILLE, CONNECTICUT, ASSIGNOR TO THE MT. CARMEL MANUFACTURING COMPANY, OF MOUNT CARMEL, CONNECTICUT, A CORPORATION OF CONNECTICUT.

SHADE ROLLER.

Application filed September 25, 1926. Serial No. 137,697.

This invention relates to a shade roller, and especially to a shade roller for use in automobiles or other vehicles, and has for an object to provide a new construction of shade roller which will be of simple construction and easily assembled, and in which the same control mechanism may be used with different lengths of rollers.

It is also an object of the invention to provide an improved control mechanism for the roller, and it is a further object of the invention to provide means whereby rotation of the roller in a given direction will not break the spring.

With the foregoing and other objects in view, I have devised the construction illustrated in the accompanying drawing forming a part of this specification. In this drawing, Fig. 1 is a partial side elevation and a partial longitudinal section through my improved shade roller.

Fig. 2 is a transverse section substantially on line 2—2 of Fig. 1 and showing the pawls in locked position.

Fig. 3 is a similar view showing the pawls released.

Fig. 4 is a transverse section substantially on line 4—4 of Fig. 1.

Fig. 5 is a transverse section substantially on line 5—5 of Fig. 1.

Fig. 6 is a top plan view of the stationary holding member at the end of the roller, and Fig. 7 is a side elevation thereof looking from the right of Fig. 6.

My improved roller comprises a metal tube 10 forming the roll, and it is mounted to rotate on suitable bearings carried by the stationary brackets 11 at the opposite ends thereof. Seated in each open end of the tube is a cupped member 12 and the open side of this cupped member is closed by a plate 13 having its edges rolled over the flange of the cupped member, as shown at 14. Extending from the right hand bracket 11 is a supporting shaft or stud 15 which is supported by this bracket. This stud extends through the plate 13 and cupped member 12 forming a bearing on which the roller may turn. The end of the shaft is formed with a flat side 16, and this end extends into a similarly shaped opening in the bracket so that it is held stationary.

Loosely mounted within the cupped member and retained therein by the plate 13 is a plurality of pawls 17. In the present construction I use three of these pawls. These pawls are of general L-shape with an outer curved surface 18, and a head 19 which forms a lug or hook to under certain conditions engage the shoulder 20 in the stationary member or shaft 15. This shoulder is preferably provided by forming a notch 21 in the shaft, and when in position this notch will be at the top of the shaft so that the shoulder is upright. It is preferred that the curved surface 18 on the pawls be of substantially the same radius as the circular side wall 22 of the cupped member 12 so as to give a greater bearing surface against this wall.

Embracing the shaft 15 within the roller is a coiled spring 23 which is connected to the shaft at its outer end by passing its end through an opening in the shaft, as shown at 24. At its opposite end the spring is not directly connected to the shaft, but carries one element 25 of a clutch which has shoulders 26 adapted to engage shoulders 27 in notches formed in a block 28. This block is of any suitable material, such as hard rubber or pressed fibre, and is permanently secured to the roller so as to turn therewith. The block may be provided with a groove 29 on one side thereof to receive the seam 30 of the tubular roller and this arrangement will key the roll to the block. By punching in the other side of the roller, as shown at 31, the block may be held against longitudinal movement in the roller. It will thus be apparent that the spring 23 has driving connection with the roller through this clutch, and when wound it will tend to turn the roller counterclockwise, as viewed in Figs. 2 and 3. It will also be apparent that should the roller be turned in this direction from the outside the clutch will merely slip, and the roller may be rotated indefinitely without breaking the spring as would be liable to happen if the end of the spring were permanently connected to the roller. This clutch, therefore, provides a one way driving connection between the spring and the roller.

The pawls 17 are arranged in the cupped member 12 as shown in Figs. 2 and 3. It will be noted that these pawls are not pivoted to the cupped member but are loosely mounted therein so that the member may turn freely with respect to the pawls under certain conditions. The pawls, however, are so shaped and the body portions 32 are of such a length that, should one of the hooks or lugs 19 of the pawl engage the shoulder 20 on the stationary member 15 while the roller is turning in the counterclockwised direction, as indicated in Fig. 2, the tail end of this pawl indicated at (A) will engage the end wall 33 of the next adjacent pawl (B) and tend to force the tail end of this pawl against the end wall 33 of the pawl (C). The tail end of the pawl (C), however, extends between the head end of the pawl (A) and the circular wall 22, and as this end is tapered the force exerted on the pawls tends to force them outwardly and clamp their curved surfaces 18 against the circular side wall 22 of the cupped member, and the greater the force applied to the cupped member to turn it in this direction the greater will be the clamping effect of the pawls and the more securely will the cupped member and the roller be held by these pawls.

The shade 34 is so attached to the roller as to be wound up by rotation of the roller in the counterclockwise direction, as viewed in Figs. 2 and 3. Therefore, a pull downwardly on the shade will rotate the roller in the clockwise direction, as viewed in these figures. While the roller is rotating in this direction there is nothing to clamp the pawls to the cupped member and this member and the roller may rotate freely. When it is desired to wind up the shade it is pulled downwardly sufficient to release the pawls by clockwise movement of the cupped member, and then if the pull on the shade is released the spring 23 will quickly rotate the roller in the counterclockwise direction, which movement by centrifugal action will throw the three pawls out against the circular side wall 22 of the cupped member, as shown in Fig. 3. In this position the heads or lugs 19 cannot engage the shoulder 20, and therefore, the roller is free to turn in the counterclockwise direction under the action of the spring to wind up the shade. If a restraining movement is now placed on the shade to reduce or stop the rotation of the roller, the lug on one of the pawls will drop into the notch 21 in the stationary member 15, as indicated in Fig. 2, and further movement of the roll in this direction will securely clamp the pawls to the cupped member and hold it against further movement.

It will be apparent from the foregoing description that with this construction there are three catches possible for each revolution. Also, as the pawls are not attached to the rotary member, by manipulation they may be caused to slip somewhat about the periphery of the cup so that the roller may be stopped in practically any position desired. It will also be apparent that, as the pawls are not attached to the cupped member, the operation of assembling is greatly simplified, as all that is necessary is to merely seat the pawls in the cupped member in the manner illustrated.

The opposite end of the roller is supported by a cupped member 12 similar to that at the right hand end, and the cup and plate at this end runs on a stud 35 carried by the left hand bracket 11. The mounting at this end is the same as at the other end except that no pawls are mounted in the cupped member, and if desired this space may be filled by a fibre washer 36 adapted to hold oil for lubricating the bearing. It is also preferred to increase the bearing surface at the right hand end of the roller by means of a block 37 having a bearing on the shaft 15, and this block has a groove 38 in its outer wall to receive the seam 30 of the roller to cause the block to rotate with the roller.

It will also be seen from the foregoing description that the spring 23 and the shaft 15 do not extend the entire length of the roller, but only the required distance at one end of the roller to give the required length of spring. Therefore, this same operating mechanism may be used for any roller having a length greater than the space required for the spring and shaft. Therefore, it is not necessary to make these elements of different lengths for use with different lengths of rollers.

Having thus set forth the nature of my invention, what I claim is:

1. In a shade roller, a stationary member having a notch, an end member having a recess about said stationary member provided with a circular outer wall, a plurality of pawls loosely mounted in said recess so that the end member may turn relative to said pawls, said pawls having hooks adapted to engage in said notch and tails having curved walls to engage the wall of the notch and so arranged that when a hook is in the recess the tail of a pawl will engage the adjacent pawl and clamp it against said wall to hold the end member against turning.

2. In a shade roller, a stationary element, a rotary element extending about the stationary element, means tending to rotate said rotary element, a plurality of pawls loosely mounted between said elements and disconnected from the rotary element so that said element may turn relative to said pawls, and coacting means on the stationary element and the pawls to clamp the pawls against the rotary element to hold it against rotation.

3. In a shade roller, a stationary element, a rotary element, means tending to turn the rotary element, a plurality of pawls loosely mounted between the two elements and normally disconnected from both elements so that they may have relative rotary movements, said pawls and stationary element being provided with shoulders adapted to coact to clamp the pawls against the rotary element to hold it against rotation.

4. In a shade roller, a stationary element having a recess, a rotary element, means tending to rotate said latter element, a plurality of pawls mounted between said elements and normally disconnected from said elements, said pawls having lugs adapted to engage one side of the recess and curved body portions to engage the rotary element, the end of the body of each pawl being adapted to engage the adjacent pawl when a hook is in a recess and clamp the adjacent pawl against the rotary element to prevent rotation thereof.

5. In a shade roller, a stationary element, a rotary element, a spring tending to turn the latter element in one direction, a plurality of pawls mounted between said elements and normally disconnected from said elements to permit relative rotary movements, and coacting means on the pawls and the stationary element to clamp the pawls against the rotary element to hold it against rotation by said spring, said coacting means permitting free rotation of the element in the opposite direction.

6. In a shade roller, a stationary element having a recess, a rotary element, a spring tending to rotate said latter element in one direction, a plurality of pawls loosely mounted between said elements and normally disconnected from said elements to permit relative rotary movements, said pawls havings lugs adapted to engage one side of the recess and body portions to engage the rotary element, each pawl being adapted to engage an adjacent pawl under coaction of a lug with said recess to clamp said pawl against the rotary element to prevent rotation of said element under action of the spring, said coacting means permitting free rotation of the element in the opposite direction.

7. In a shade roller, a stationary element having a shoulder, a rotary element having a circular wall about the stationary element, a spring tending to turn the rotary element, a plurality of pawls loosely mounted between the elements and disconnected from said rotary element and each having curved outer surfaces to engage said circular wall, said pawls also having lugs to engage said shoulder and each pawl being adapted to engage an adjacent pawl under coaction of its lug and said shoulder to clamp the adjacent pawl against said wall to prevent rotation of the rotary element under action of the spring.

8. In a shade roller, a rotary member, a spring tending to rotate said member in one direction, a cupped member carried by the rotary member, a stationary member within the cupped member, a plurality of pawls loosely mounted within the cupped member and disconnected from said member to permit rotation of said member relative to the pawls, and cooperating means carried by the stationary member and the pawls to clamp the pawls against the sides of the cupped member under action of the spring.

9. In a shade roller, a rotary member, a spring tending to rotate said member in one direction, a cupped member carried by the rotary member, a stationary member within the cupped member, a plurality of pawls loosely mounted within the cupped member and disconnected from said member to permit rotation of said member independently of the pawls, said stationary member having a notch in one side providing a shoulder, and lugs on the pawls adapted to engage said shoulder, each of said pawls being of a length to engage an adjacent pawl and clamp it against the sides of the cupped member under the action of the spring when a lug engages said shoulder.

10. In a shade roller, a rotary member, a spring tending to rotate said member in one direction, a stationary member provided with a shoulder, a retaining member carried by the rotary member and having a circular wall about the stationary member, a plurality of pawls loosely mounted in the retaining member, said pawls being of general L-shape with curved outer walls to engage said circular wall and the head providing a lug to engage said shoulder, the body of each pawl being of a length to engage the head of an adjacent pawl when a lug engages said shoulder under action of the spring to clamp the pawls against said circular wall and by engagement therewith to hold it against rotation.

In testimony whereof I affix my signature.

JOSEPH GOODMAN.